US012513723B2

(12) United States Patent
Kalhan

(10) Patent No.: US 12,513,723 B2
(45) Date of Patent: Dec. 30, 2025

(54) TRANSMISSION COLLISION AVOIDANCE IN VEHICLE-TO-VEHICLE COMMUNICATIONS

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 345 days.

(21) Appl. No.: 18/277,271

(22) PCT Filed: Feb. 17, 2022

(86) PCT No.: PCT/US2022/016697
§ 371 (c)(1),
(2) Date: Aug. 15, 2023

(87) PCT Pub. No.: WO2022/178058
PCT Pub. Date: Aug. 25, 2022

(65) Prior Publication Data
US 2024/0147530 A1 May 2, 2024

Related U.S. Application Data

(60) Provisional application No. 63/166,027, filed on Mar. 25, 2021, provisional application No. 63/150,431, filed on Feb. 17, 2021.

(51) Int. Cl.
*H04W 72/51* (2023.01)
*H04W 4/06* (2009.01)
(Continued)

(52) U.S. Cl.
CPC ............. *H04W 72/51* (2023.01); *H04W 4/06* (2013.01); *H04W 48/14* (2013.01); *H04W 72/02* (2013.01);
(Continued)

(58) Field of Classification Search
CPC ..... H04W 72/51; H04W 72/40; H04W 72/30; H04W 4/06; H04W 48/14; H04W 72/02; H04W 72/04; H04W 74/0816
See application file for complete search history.

(56) References Cited

U.S. PATENT DOCUMENTS

| 2008/0055068 A1 | 3/2008 | Van Wageningen et al. |
| 2017/0206238 A1* | 7/2017 | Coutinho .............. H04W 4/021 |

(Continued)

*Primary Examiner* — Ajay Cattungal

(57) ABSTRACT

The devices, systems, and methods discussed herein involve a vehicle, in which a reporting user equipment (UE) device is located, using one or more sensors to search and identify other nearby UE-containing vehicles. The sensor output is used as an input to an Artificial Intelligence (AI) algorithm to identify the UE-containing vehicles that could be potential hidden-nodes relative to each other. After detecting the potential hidden-node vehicles, the reporting UE has the option to inform the transmitting UEs to reserve orthogonal resources for their next SL transmission. If the reporting UE is already in communication with one of the potential hidden-node UEs, the reporting UE is aware of the other UE's transmit resources. Based on this knowledge, the reporting UE forwards the other UE's resource reservation information to the other potential hidden-node UE. Alternatively, the reporting UE broadcasts a Neighbor List (NL) message with the heading-direction of the hidden-node vehicles.

22 Claims, 4 Drawing Sheets

(51) Int. Cl.
  *H04W 48/14*    (2009.01)
  *H04W 72/02*    (2009.01)
  *H04W 72/04*    (2023.01)
  *H04W 72/30*    (2023.01)
  *H04W 72/40*    (2023.01)
  *H04W 74/0816*  (2024.01)

(52) U.S. Cl.
  CPC ........... *H04W 72/04* (2013.01); *H04W 72/30* (2023.01); *H04W 72/40* (2023.01); *H04W 74/0816* (2013.01)

(56) References Cited

U.S. PATENT DOCUMENTS

| | | |
|---|---|---|
| 2018/0063286 A1* | 3/2018 | Braga Ameixieira .... G06F 8/65 |
| 2018/0199349 A1 | 7/2018 | Hehn et al. |
| 2019/0238658 A1* | 8/2019 | Shimizu .................. H04W 4/46 |
| 2019/0297526 A1 | 9/2019 | Das et al. |
| 2020/0012295 A1* | 1/2020 | Kim .................... G06Q 10/0631 |
| 2020/0137773 A1* | 4/2020 | Tang ...................... H04W 72/23 |
| 2020/0235848 A1* | 7/2020 | Nguyen ................ H04L 1/0038 |
| 2020/0365033 A1* | 11/2020 | Cheng ................ G08G 1/0145 |
| 2021/0099847 A1 | 4/2021 | Uchiyama et al. |
| 2022/0078791 A1* | 3/2022 | Jiang .................... H04W 56/001 |
| 2022/0191662 A1* | 6/2022 | Cheraghi ............. G08G 1/0125 |
| 2024/0073796 A1* | 2/2024 | Azizi .................. H04W 92/045 |
| 2025/0280436 A1* | 9/2025 | Qiao ..................... H04W 72/51 |

\* cited by examiner

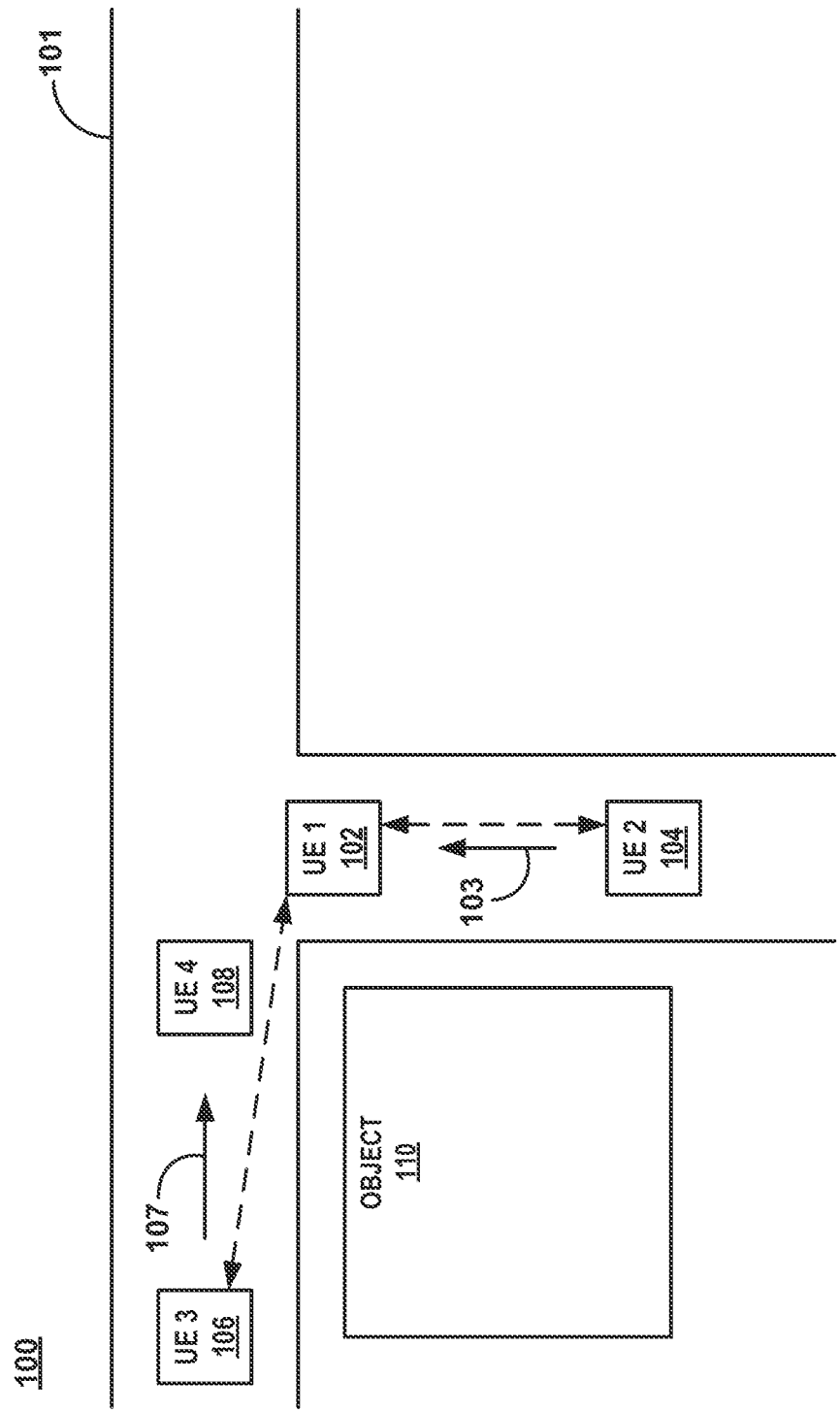

TRANSMISSION COLLISION AVOIDANCE IN VEHICLE-TO-VEHICLE COMMUNICATIONS

CLAIM OF PRIORITY

The present application claims priority to Provisional Application No. 63/150,431, entitled "METHOD FOR AVOIDING TRANSMISSION COLLISIONS IN VEHICLE-TO-VEHICLE COMMUNICATIONS," docket number TPRO 00356 US, filed Feb. 17, 2021, and to Provisional Application No. 63/166,027, entitled "NETWORK-ASSISTED TRANSMISSION COLLISION AVOIDANCE IN VEHICLE-TO-VEHICLE COMMUNICATIONS," docket number TPRO 00358 US, filed Mar. 25, 2021, both of which are assigned to the assignee hereof and hereby expressly incorporated by reference in their entirety.

FIELD

This invention generally relates to wireless communications and more particularly to transmission collision avoidance in vehicle-to-vehicle communications.

BACKGROUND

Data transmission collisions create problems in networks in which multiple devices are attempting to transmit data. Thus, avoiding data transmission collisions is advantageous.

SUMMARY

The devices, systems, and methods discussed herein involve a vehicle, which includes a reporting user equipment (UE) device, using one or more sensors to search and identify other nearby UE-containing vehicles. The sensor output is used as an input to an Artificial Intelligence (AI) algorithm to identify the UE-containing vehicles that could be potential hidden-nodes relative to each other. After detecting the potential hidden-node vehicles, the reporting UE has the option to inform the transmitting UEs to reserve orthogonal resources for their next SL transmission. If the reporting UE is already in communication with one of the potential hidden-node UEs, the reporting UE is aware of the other UE's transmit resources. Based on this knowledge, the reporting UE forwards the other UE's resource reservation information to the other potential hidden-node UE. Alternatively, the reporting UE broadcasts a Neighbor List (NL) message with the heading-direction of the hidden-node vehicles.

BRIEF DESCRIPTION OF THE DRAWINGS

FIG. 1B is a block diagram of an example of a system in which a first user equipment (UE) device determines a likelihood that two other UE devices may be hidden nodes to each other and transmits a message to one of the other UE devices, which results in a reduction in interference between the two other UE devices.

DETAILED DESCRIPTION

Figure 1A:
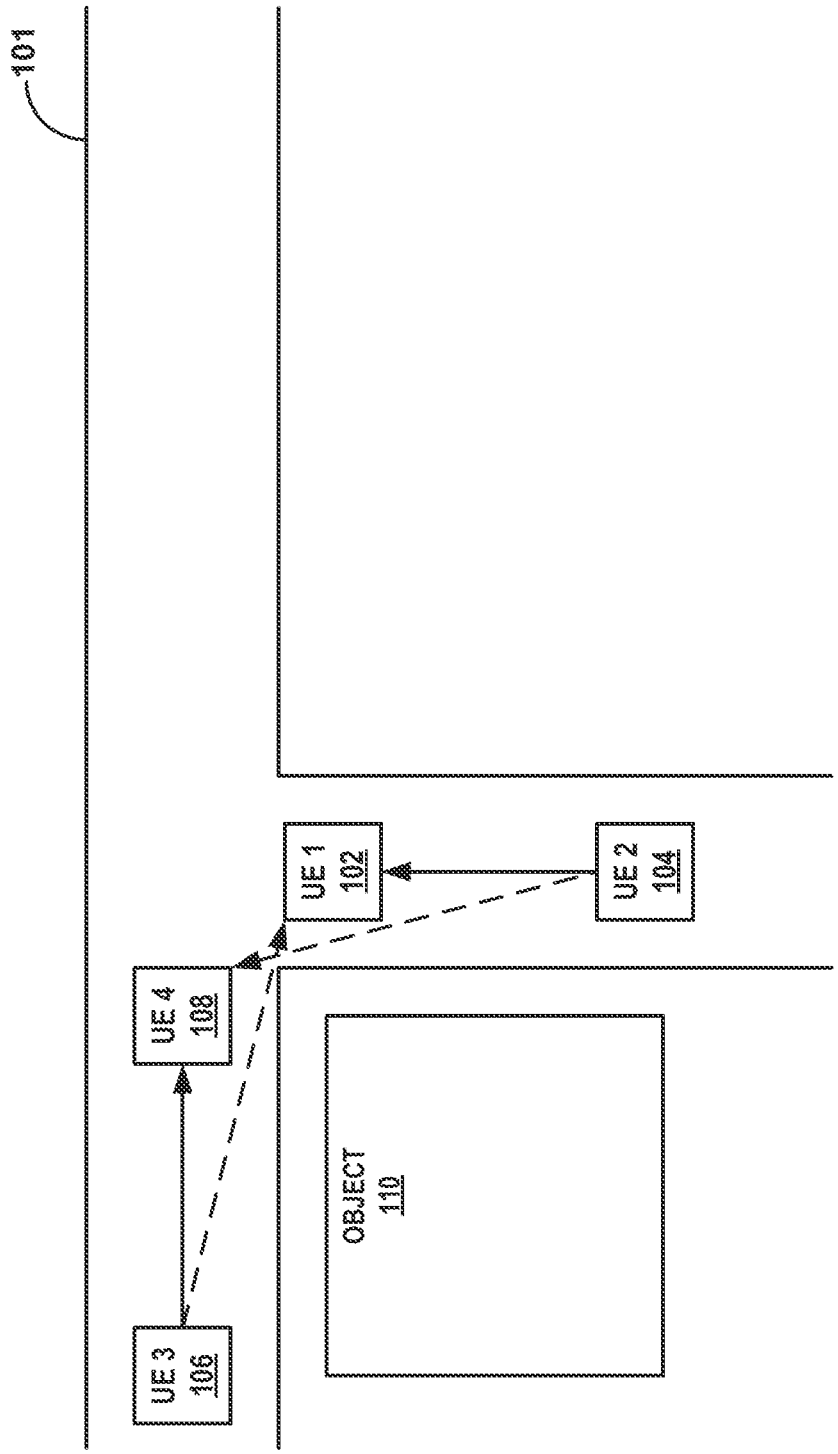
FIG. 1A is a block diagram of an example of a hidden-node scenario.

The examples discussed below are generally directed to vehicle-to-everything (V2X) communication, which is the passing of information from a vehicle to any entity that may affect the vehicle or that the vehicle may affect. For example, V2X is a vehicular communication system that incorporates other, more specific types of communication, including vehicle-to-vehicle (V2V), V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: V2X based on Institute of Electrical and Electronics Engineers 802.11, and cellular-based V2X (C-V2X). Some examples of V2X protocols include Long-Term Evolution (LTE) (Rel-14) V2X Mode 3 and Mode 4 and 5G New Radio (NR) V2X Mode 1 and Mode 2.

In some of the examples described herein, the wireless communication devices are user equipment devices (UEs) or vehicle user equipment devices (VUEs) that exchange data (e.g., in the Extended Sensor use case), which is gathered through local sensors, or live video data among vehicles, Road Side Units (RSUs), devices of pedestrians, and V2X application servers. As will be discussed more fully below, in some cases, vehicles equipped with an Advanced Driver Assistance System (ADAS) use sensors such as cameras, radar, and/or lidar to sense the neighboring environment and other vehicles.

However, with multiple vehicles transmitting signals within the same general area, data transmission collisions may occur, which wastes system resources when signals must be resent. Moreover, delayed or failed signal transmissions may also cause safety issues for the vehicles and pedestrians in the area. Thus, it may be advantageous to implement inter-UE coordination (IUC) messaging to enhance Mode 2 resource allocation performance, which reduces the likelihood of data transmission collisions since the UEs can be allocated communication resources that are less likely to interfere with each other.

When considering data transmission collisions, there are two main scenarios. In the first scenario, the collision between two data transmissions has already occurred, and the receiving UEs have detected the collision. The second scenario is when there is a potential for two data transmissions to collide, but the actual data transmissions have not yet occurred. The second scenario happens when two transmitting UEs are unaware of each other and both happen to reserve the same transmission resources for their respective future data transmissions. The first and the second scenarios are referred to as "post-collision" and "potential-collision," respectively.

In NR V2X, the transmitting UEs are not allowed to reserve their initial transmissions and are half-duplex constrained, meaning they cannot simultaneously transmit and receive signals. As a consequence, in the "post-collision" scenario, two transmitting UEs could accidentally select the same resource or time-slot for their transmissions, causing a data collision. Similarly, a transmitting UE and a receiving UE, which are paired to each other, could accidentally select the same resource or time-slot for their transmissions, which results in an unsuccessful data reception.

To solve this problem, NR V2X feedback (e.g., a 1-bit Physical Sidelink Feedback Channel (PSFCH)) is proposed as an IUC-based solution. In the first case, the intended receiving UEs transmit the 1-bit PSFCH to their respective transmitting UEs, informing them to perform a resource reselection before the next (re-)transmission. In the second case, a third UE (1) detects the half-duplex situation when the transmit-receive paired UEs overlap each other's transmissions, and (2) transmits the PSFCH to one of the UEs of the transmit-receive paired UEs, informing the UE to perform resource reselection.

The "potential-collision" is a much more challenging scenario. In order to avoid potential-collisions, the transmit UEs must be able to predict them before the data transmissions occur. The main cause for the potential-collisions is when two transmitting UEs are in a hidden-node situation. A typical hidden-node situation occurs when there is a blockage such that the two transmitting UEs' transmissions are unable to reach each other but still cause interference to each other's respective receiving UEs.

An example of a hidden-node situation can be seen in FIG. 1A in which various UEs are moving on roadway 101. More specifically, FIG. 1A shows that transmissions from UE 2, 104, and UE 3, 106, are unable to reach each other due to object 110 (e.g., a building). However, transmissions from UE2, 104, can cause interference with UE 4, 108, which is a receiving UE for UE 3, 106. Similarly, transmissions from UE3, 106, can cause interference with UE 1, 102, which is a receiving UE for UE 2, 104. The transmissions to intended recipients are shown as solid arrows in FIG. 1A, and the transmissions that cause unintended interference are shown as dashed arrows in FIG. 1A. The hidden-node situation is preventable if the respective hidden-node transmitting UEs (e.g., UE 2, 104, and UE 3, 106 in FIG. 1A) avoid using the same transmission resource.

One solution to the hidden-node situation is to support IUC messaging from the receiving UE to inform the transmitting UE of a list of (not-)preferred resources for transmission. However, transmission of the list itself could cause interference. Moreover, this type of coordination only works after the transmission collision between the hidden-nodes has already occurred and been detected.

Another solution is to assign orthogonal resources to prevent hidden-node occurrences. For example, different resource pools could be assigned based on the UE's heading direction. Thus, a transmitting UE heading in the north-south direction is assigned resource pool A, and another transmitting UE heading in the east-west direction is assigned resource pool B for their respective transmissions. The resource pool assignment is done via the network configuration procedure.

Although the resource pool assignment mitigates the hidden-node problem, the resource pool assignment scheme requires a pre-allocation of resources for each direction. This pre-allocation of resources may cause an inefficiency in resource utilization, especially during low-traffic time periods. To mitigate the resource underutilization, the resource pool assignment scheme may be disabled during low-traffic time-periods, which requires constant traffic-monitoring and the control signaling overhead to disable/enable the scheme.

As an improvement to the orthogonal resource allocation method, a local gNB/RSU (e.g., base station (gNodeB)/Roadside Unit) could dynamically assign resource pools to different groups of UEs approaching the intersection and/or a region. For example, consider a scenario in which a gNB/RSU is located on top of the object 110 (e.g., building) in FIG. 1A, the gNB/RSU first senses the UEs approaching the intersection. This could be done either by detecting the UE's uplink/sidelink transmissions or using visual-camera and lidar/radar-detection sensing technologies.

After the hidden-nodes (e.g., UE 2, 104 and UE 3, 106) are identified, the gNB/RSU broadcasts orthogonal resource assignment messages on the cellular band or the V2X band (e.g., sidelink transmission) to the respective groups of UEs. However, the resource assignment broadcasting in the V2X band may crowd out other V2V transmissions in the precious V2X resources. This overhead is partially reduced if the gNB/RSU unicasts or groupcasts messages to the targeted UE or group of selected UEs approaching the intersection, respectively.

For the resource assignment broadcasts, sidelink (SL) transmissions are preferred due to the lower signaling overhead and less latency. By comparison, for cellular band transmissions, the gNB/RSU must either broadcast a periodic System Information Block (SIB) message or transmit dedicated transmissions, causing large latency or paging signaling overhead, respectively. Furthermore, there is a deployment cost of installing a gNB/RSU at every location where a hidden-node problem could occur.

The devices, systems, and methods discussed herein involve a vehicle, in which a reporting UE is located, using one or more sensors to search and identify other near-by vehicles. The sensor output is used as an input to an Artificial Intelligence (AI) algorithm to identify the UE-containing vehicles that could be potential hidden-nodes relative to each other. After detecting the potential hidden-node vehicles, the reporting UE has the option to inform the transmitting UEs to reserve orthogonal resources for their next SL transmission. If the reporting UE is already in communication with one of the potential hidden-node UEs, the reporting UE is aware of the other UE's transmit resources. Based on this knowledge, the reporting UE forwards the other UE's resource reservation information to the other potential hidden-node UE. Alternatively, the reporting UE broadcasts a Neighbor List (NL) message with the heading-direction of the hidden-node vehicles. The NL message broadcast is an implicit indication of the hidden-node situation to the hidden-node UEs.

As used herein, the terms "hidden-node," "hidden-node vehicle," and "hidden-node UE" may all be used interchangeably to refer to a vehicle in which a UE is temporarily or permanently located and that is determined to at least potentially be a hidden-node relative to at least one other UE.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

FIG. 1B is a block diagram of an example of a system 100 in which a first user equipment (UE) device determines a likelihood that two other UE devices may be hidden nodes to each other and transmits a message to one of the other UE devices, which results in a reduction in interference between the two other UE devices. FIG. 1B shows various UE devices operating on roadway 101. The UE devices operate in accordance with at least one revision of the 3rd Generation Partnership Project 5G New Radio (3GPP 5G NR) communication specification. In other examples, the UE devices may operate in accordance with other communication specifications.

Figure 2:
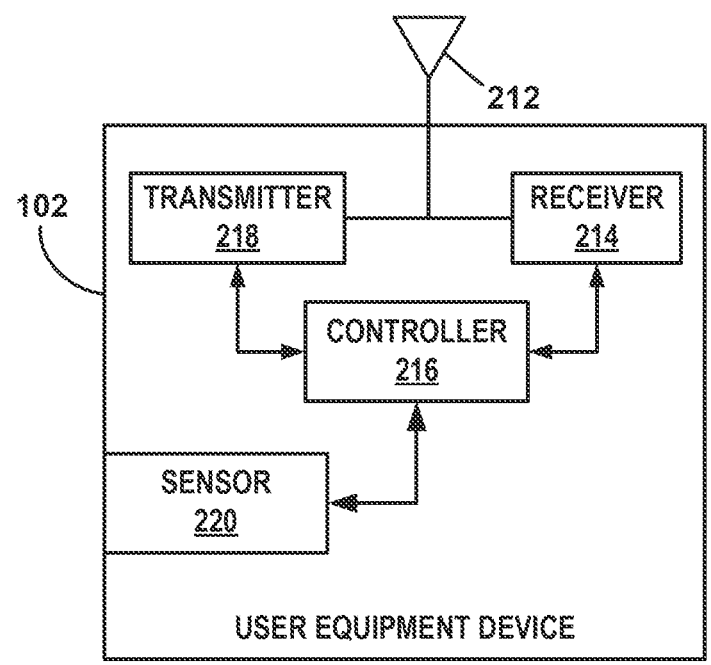
FIG. 2 is a block diagram of an example of the user equipment devices shown in FIGS. 1A and 1B.

In the interest of brevity, FIG. 1B only depicts four UE devices. However, any number of UE devices may be utilized. As shown in FIG. 2, user equipment device (UE) 102 comprises controller 216, transmitter 218, receiver 214, and sensor 220, as well as other electronics, hardware, and software code. UE 102 may also be referred to herein as a VUE or simply as a wireless communication device (WCD). UE 102 is wirelessly connected to a radio access network (not shown) via one or more base stations (not shown), which provide various wireless services to UE 102. For the example shown in FIG. 1B, UE 102 operates in accordance with at least one revision of the 3rd Generation Partnership Project 5G New Radio (3GPP 5G NR) communication specification. In other examples, UE 102 may operate in accordance with other communication specifications. For the example shown in FIG. 1B, all of the UEs have the same components, circuitry, and configuration as UE 102 from FIG. 2. However, any of the UEs in FIG. 1B may have components, circuitry, and configuration that differ from UE 102, in other examples.

UE 102 is any fixed, mobile, or portable equipment that performs the functions described herein. The various functions and operations of the blocks described with reference to UE 102 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes software code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2 perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

Sensor 220 is a camera in the example of FIG. 2. However, in other examples, sensor 220 may be one or more of the following: a camera, lidar, radar, and ultrasound. In other examples, sensor 220 could be a receiver configured to receive a beacon signal transmitted by another UE in a particular frequency or other known communication resource. In further examples, sensor 220 is a receiver configured to receive V2V signals. In still further examples, sensor 220 is configured to detect signals that do not require decoding. Any suitable sensor may be used in UE 102 to sense the environment around UE 102 and to sense other vehicles.

For the example of FIG. 1B, UE 1, 102, is located in an Advanced Driver Assistance Systems (ADAS) enabled vehicle. UE 1, 102, utilizes its sensor 220 to determine, without receiving communication signals, a presence and/or location of UE 2, 104; UE 3, 106; and object 110, which is located between UE 2, 104, and UE 3, 106. In the example of FIG. 1B, object 110 is a building. However, object 110 may be a geographic formation (e.g., hill/mountain) or any structure/object that interferes with communication signal transmission, in other examples.

Controller 216 of UE 1, 102 is coupled to sensor 220 and is configured to determine, based at least partially on output from sensor 220, a likelihood that object 110 will interfere with communication signal transmission between UE 2, 104, and UE 3, 106. In some examples, controller 216 of UE 1, 102 uses an Artificial Intelligence (AI) algorithm to identify the UEs that could be potential hidden-nodes, relative to each other. Thus, in these examples, the determined likelihood is a calculated value that is output from the AI algorithm and reflects the likelihood that object 110 will interfere with communication signal transmission between UE 2, 104 and UE 3, 106.

Transmitter 218 of UE 1, 102 is configured to transmit, to UE 3, 106, a message that results in UE 3, 106 using communication resources for transmission in a manner that will at least reduce interference with transmissions by UE 2, 104. In some examples, the message transmitted by transmitter 218 may be an indicator. In further examples, the message identifies communication resources reserved by UE 2, 104 for transmission. In response to receiving the message, UE 3, 106 may refrain from using resources identified in the message, may transmit communication signals with a lower transmission power, may transmit communication signals with a different code, or some combination of the foregoing.

In some examples, transmitter 218 of UE 1, 102 is configured to broadcast the message such that the message can be received at least by UE 2, 104 and UE 3, 106. In further examples, transmitter 218 transmits the message when the previously determined likelihood of interference is above a threshold, is within a range of values associated with a particular likelihood of interference, is at least approximately equivalent to a previously determined likelihood of interference that was associated with a situation in which interference occurred in the past, and/or is at least approximately equivalent to a likelihood of interference value that was contained in a set of training data utilized to train the AI algorithm used by controller 216 of UE 1, 102.

In other examples, controller 216 of UE 1, 102 is further configured to determine that UE 2, 104 will transmit a communication signal, and transmitter 218 of UE 1, 102 is further configured to transmit the message to UE 3, 106 in response to controller 216 determining that UE 2, 104 will transmit the communication signal. For example, if UE 1, 102 has the knowledge that UE 2, 104 has reserved a particular communication resource or if another device (e.g., a gNB or another UE) has scheduled a particular communication resource for UE 2, 104, then controller 216 of UE 1, 102 may make the determination that UE 2, 104 will transmit a communication signal.

In the examples in which UE 1, 102 obtains the knowledge that UE 2, 104 has reserved a particular communication resource, receiver 214 of UE 1, 102 is configured to receive a resource reservation signal. In some cases, the resource reservation signal is received from UE 2, 104. In other cases, the resource reservation signal is received from another device (e.g., a gNB or another UE) that has scheduled the communication resource for UE 2, 104. The resource reservation signal indicates that UE 2, 104 will transmit the communication signal using a particular transmission resource, and controller 216 of UE 1, 102 is configured to predict that UE 2, 104 will transmit a communication signal based on the receipt of the resource reservation signal.

In still further examples, receiver 214 of UE 1, 102 is configured to receive a resource reservation signal from another device (e.g., a gNB or another UE). The resource reservation signal indicates that the other device that transmitted the resource reservation signal will transmit a communication signal using a transmission resource, and controller 216 of UE 1, 102 is configured to determine that the other device will transmit the communication signal based on the receipt of the resource reservation signal.

Some of the foregoing examples describe UE 1, 102 detecting a potential hidden-node scenario (e.g., between UE 2, 104 and UE 3, 106) and informing the hidden-node UEs to reserve orthogonal resources for their next SL transmission. If the UE 1, 102 is already in communication with one of the potential hidden-node UEs (e.g., UE 2, 104), UE 1, 102 is aware of the other UE's transmit resources. Based on this knowledge, UE 1, 102 can forward the other UE's resource reservation information to the other potential hidden-node UE (e.g., UE 3, 106).

However, if more than one pair of potential hidden-node UEs are identified by UE 1, 102, it can become inefficient for UE 1, 102 to transmit multiple forwarding transmissions. Thus, in some examples, UE 1, 102 broadcasts a Neighbor List (NL) message containing the heading-direction of each of the identified hidden-node UEs. The NL message broadcast is an implicit indication of the hidden-node situation to UE 2, 104 and UE 3, 106.

Sending each hidden-node UE's heading-direction in the NL message increases the overhead since it requires several bits to represent this information. Thus, in other examples, the AI algorithm can be configured to generate an "intelligent" NL message. For example, the NL message does not need to list UEs that have a low likelihood of causing interference as a hidden-node UE (e.g., UEs that are moving away from the intersection or UEs that are too far away from the intersection to cause interference). After deleting these non-interfering UEs from the NL, the remaining UEs are assigned a resource pool or group based on their heading-direction and/or location.

In the example shown in FIG. 1B, UE 1, 102 can broadcast an NL message indicating that UE 2, 104 is assigned to resource pool A or group A because it is moving in a first direction of travel 103. The NL message also indicates that UE 3, 106 and UE 4, 108 are assigned to resource pool B or group B because both UEs are moving in the same second direction of travel 107. The assignment of UEs to a resource pool or group based on their respective heading/direction of travel helps to generate a concise NL format, reducing the overall signaling overhead. However, the assignments are just a recommendation by UE 1, 102 to the UEs that receive the NL message. Each of the NL message-receiving UEs take the suggested assignment information into account when reserving resources for their next SL transmission and may choose whether or not to transmit their next SL transmission using the resource pool to which they were assigned, as indicated in the most recently received NL message.

In some instances, it is possible that multiple UEs may approach the same intersection and each broadcast an NL message. Thus, in some examples, excessive NL message broadcasting can be avoided when only one UE within a region is allowed to do periodic NL message broadcasting. For example, the AI algorithm can be further configured to determine whether a UE should broadcast the NL message in the presence of another neighboring UE that is already broadcasting an NL message.

If a non-NL message broadcasting UE finds additional hidden-node UEs not included in the previous NL message broadcast only then is that UE allowed to broadcast an NL message, as well. In some examples, the additional broadcast just contains the additional hidden-node UEs that were not included in the previous NL message broadcast. In other examples, if a predetermined/preconfigured amount of time has passed since the previous NL message was broadcasted, the additional broadcast could include all of the hidden-node UEs from the previous NL message as well as the additional hidden-node UEs that were not included in the previous NL message broadcast. However, if all of the hidden-node UEs are included in the additional broadcast, the previous NL message broadcasting UE may be configured to cease transmitting the NL message.

Given the foregoing description of the NL message, in some examples, the message that UE 1, 102 transmits to UE 3, 106, which results in UE 3, 106 using communication resources for transmission in a manner that will at least reduce interference with transmissions by UE 2, 104, is an NL message broadcasted by transmitter 218 of UE 1, 102. In these examples, the NL message identifies UE 2, 104 and UE 3, 106 as neighboring UE devices. In other examples, the NL message may also identify a first direction of travel 103 of UE 2, 104 and a second direction of travel 107 of UE 3, 106.

As mentioned above, in some examples, the NL message identifies an assignment of UE 2, 104 to a first group (e.g., group A) and identifies an assignment of UE 3, 106 to a second group (e.g., group B). In further examples, controller 216 of UE 1, 102 is configured to assign UE devices traveling in a first direction of travel 103 to the first group and assign UE devices traveling in a second direction of travel 107 to the second group. In other examples, controller 216 of UE 1, 102 is configured to assign UE devices located in a first area to the first group and assign UE devices located in a second area to the second group. In these examples, the first area and the second area can be any areas that are sufficiently defined to enable the UEs to determine a likelihood of a potential hidden-node scenario.

In still further examples, the NL message identifies a first communication resource pool (e.g., resource pool A) for transmission by UE devices assigned to the first group and a second communication resource pool (e.g., resource pool B) for transmission by UE devices assigned to the second group. In response to receiving the NL message that identifies the first communication resource pool for transmission by UE devices assigned to the first group and a second communication resource pool for transmission by UE devices assigned to the second group, UE 3, 106 may choose to transmit, based at least partially on the NL message, a sidelink transmission using communication resources selected from the communication resource pool that corresponds with the group to which UE 3, 106 was assigned.

In some examples, transmitter 218 of UE 1, 102 is further configured to periodically broadcast the NL message. In further examples, transmitter 218 of UE 1, 102 is configured to refrain from broadcasting a current version of the NL message if the current version of the NL message is the same as a previous version of the NL message. In still further examples, transmitter 218 of UE 1, 102 is configured to refrain from broadcasting a current version of the NL message if the current version of the NL message is a subset of a previous version of the NL message.

Figure 3:
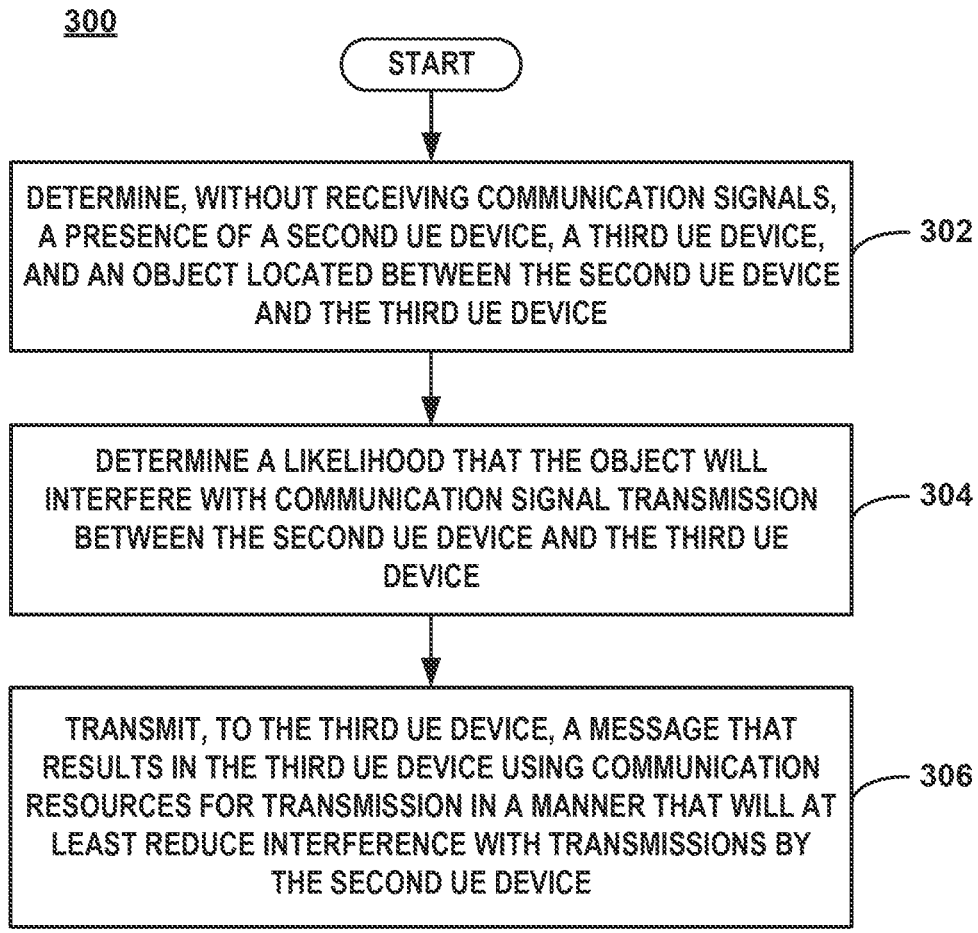
FIG. 3 is a flowchart of an example of a method in which a first user equipment (UE) device determines a likelihood that two other UE devices may be hidden nodes to each other and transmits a message to one of the other UE devices, which results in a reduction in interference between the two other UE devices.

FIG. 3 is a flowchart of an example of a method in which a first user equipment (UE) device determines a likelihood that two other UE devices may be hidden nodes to each other and transmits a message to one of the other UE devices, which results in a reduction in interference between the two other UE devices. The method 300 begins at step 302 with sensing, by the first UE device without receiving communication signals, a second UE device, a third UE device, and an object located between the second UE device and the third UE device. At step 304, the first UE device determines a likelihood that the object will interfere with communication signal transmission between the second UE device and the third UE device. At step 306, the first UE device transmits, to the third UE device, a message that results in the third UE device using communication resources for transmission in a manner that will at least reduce interference with transmissions by the second UE device. In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A first user equipment (UE) device comprising:
   at least one sensor configured to determine, without receiving communication signals, a presence of:
      a second UE device,
      a third UE device, and
      an object located between the second UE device and the third UE device;
   a controller coupled to the at least one sensor and configured to determine, based at least partially on output from the at least one sensor, a likelihood that the object will interfere with communication signal transmission between the second UE device and the third UE device; and
   a transmitter configured to transmit, to the third UE device, a message that results in the third UE device using communication resources for transmission in a manner that will at least reduce interference with transmissions by the second UE device.

2. The first UE device of claim 1, wherein the transmitter is further configured to broadcast the message such that the message can be received at least by the third UE device and the second UE device.

3. The first UE device of claim 1, wherein the controller is further configured to determine that the second UE device will transmit a communication signal, the transmitter further configured to transmit the message in response to the controller determining that the second UE device will transmit the communication signal.

4. The first UE device of claim 3, further comprising:
   a receiver configured to receive a resource reservation signal from another device, the resource reservation signal indicating that the another device will transmit the communication signal using a transmission resource, the controller further configured to determine that the another device will transmit a communication signal based on the receipt of the resource reservation signal.

5. The first UE device of claim 3, further comprising:
   a receiver configured to receive a resource reservation signal from the second UE device, the resource reservation signal indicating that the second UE device will transmit the communication signal using a transmission resource, the controller further configured to predict that the second UE device will transmit a communication signal based on the receipt of the resource reservation signal.

6. The first UE device of claim 1, wherein the message is a message identifying communication resources reserved by the second UE device for transmission.

7. The first UE device of claim 1, wherein the message is a neighbor list message broadcasted by the transmitter, the neighbor list message identifying the second UE device and the third UE devices as neighboring UE devices.

8. The first UE device of claim 7, wherein the neighbor list message identifies a first direction of travel of the second UE device and a second direction of travel of the third UE device.

9. The first UE device of claim 7, wherein the neighbor list message identifies an assignment of the second UE device to a first group and an assignment of the third UE device to a second group.

10. The first UE device of claim 9, wherein the controller is further configured to assign UE devices traveling in a first direction to the first group and assign UE devices traveling in a second direction to the second group.

11. The first UE device of claim 9, wherein the controller is further configured to assign UE devices located in a first area to the first group and assign UE devices located in a second area to the second group.

12. The first UE device of claim 9, wherein the neighbor list message identifies a first communication resource pool for transmission by UE devices assigned to the first group and a second communication resource pool for transmission by UE devices assigned to the second group.

13. The first UE device of claim 7, wherein the transmitter is further configured to periodically broadcast the neighbor list message.

14. The first UE device of claim 7, wherein the transmitter is further configured to refrain from broadcasting a current version of the neighbor list message if the current version of the neighbor list message is the same as a previous version of the neighbor list message.

15. The first UE device of claim 7, wherein the transmitter is further configured to refrain from broadcasting a current version of the neighbor list message if the current version of the neighbor list message is a subset of a previous version of the neighbor list message.

16. A first user equipment (UE) device comprising:
a receiver configured to receive, from a second UE device, a message that results in the first UE device using communication resources for transmission in a manner that will at least reduce interference with transmissions by a third UE device, the message sent in response to a determination, by the second UE device, of a likelihood that an object located between the first UE device and the third UE device will interfere with communication signal transmission between the first UE device and the third UE device;
a controller configured to select communication resources that will not interfere with communication resources that will be utilized by the third UE device; and
a transmitter configured to transmit a sidelink transmission utilizing the selected communication resources.

17. The first UE device of claim 16, wherein the message is a message identifying communication resources reserved by the third UE device for transmission.

18. The first UE device of claim 16, wherein the message is a neighbor list message broadcasted by the second UE device, the neighbor list message identifying the first UE device and the third UE devices as neighboring UE devices.

19. The first UE device of claim 18, wherein the neighbor list message identifies a first direction of travel of the first UE device and a second direction of travel of the third UE device.

20. The first UE device of claim 18, wherein the neighbor list message identifies an assignment of the first UE device to a first group and an assignment of the third UE device to a second group.

21. The first UE device of claim 20, wherein the neighbor list message identifies a first communication resource pool for transmission by UE devices assigned to the first group and a second communication resource pool for transmission by UE devices assigned to the second group.

22. The first UE device of claim 21, wherein the transmitter is further configured to transmit, based at least partially on the neighbor list message, the sidelink transmission using communication resources selected from the first communication resource pool.

* * * * *